United States Patent Office 3,686,093
Patented Aug. 22, 1972

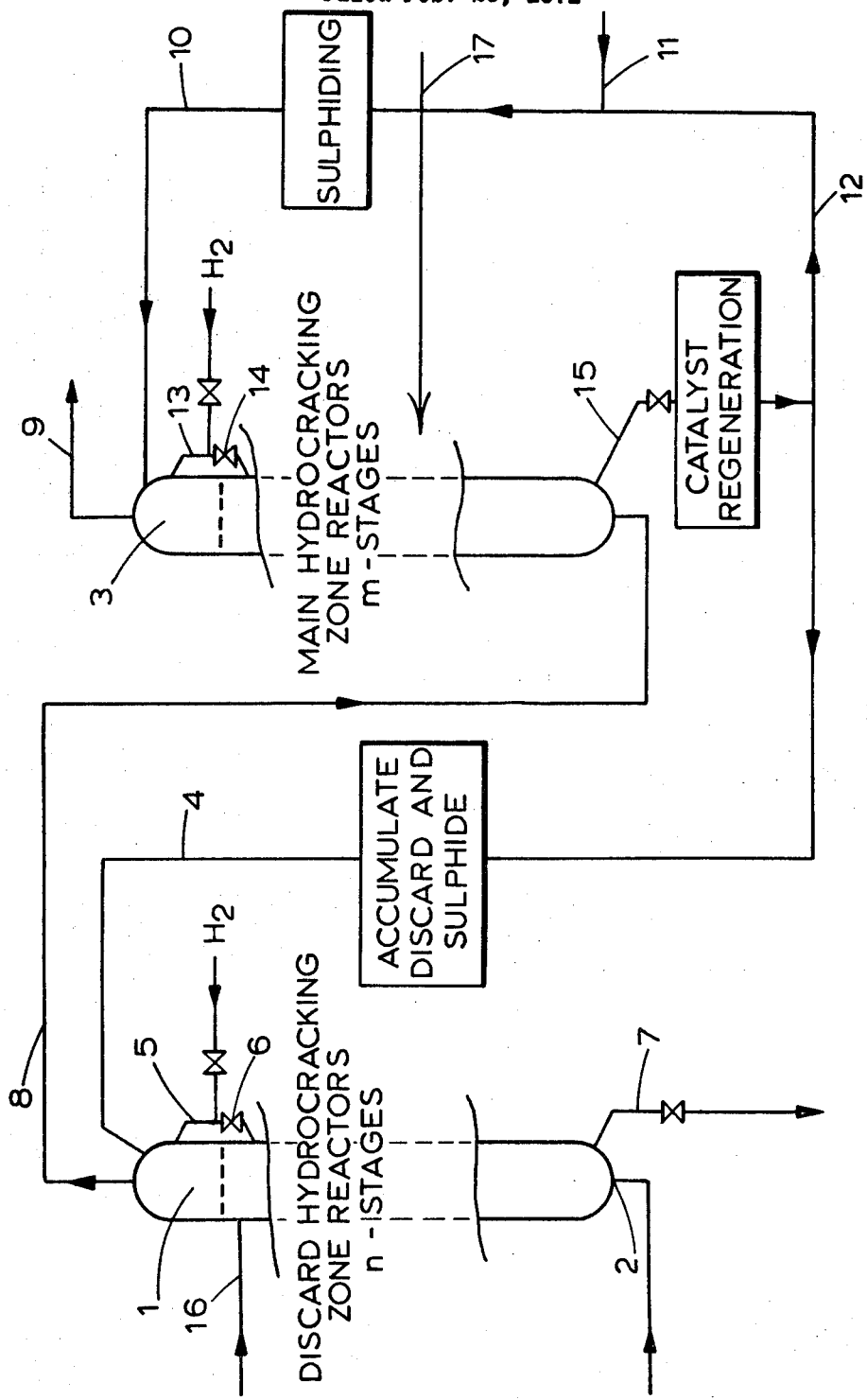

3,686,093
HYDROCRACKING ARRANGEMENT
Robert Leard Irvine, Rob Ness Pyle Hill,
Woking, Surrey, England
Filed Feb. 25, 1971, Ser. No. 118,698
Claims priority, application Great Britain, Feb. 27, 1970,
9,598/70
Int. Cl. C10g 23/00, 37/00
U.S. Cl. 208—57                    4 Claims

ABSTRACT OF THE DISCLOSURE

The invention relates to a hydrocracking arrangement. Crude or residua feedstock is in a first stage treated to hydrogenate its non-hydrocarbon content using a fluidised catalyst descending in a multi-bed reactor in countercurrent to feed and hydrogen. The effluent from the first reactor passes to a discard hydrocracker also with descending fluidised catalyst and ascending feed and hydrogen, the catalyst being regenerated low activity catalyst from the subsequent main hydrocracking zone.

---

This invention relates to a hydrocracking arrangement.

My U.S. application Ser. No. 810,127 filed Sept. 25, 1969 (now U.S. Pat. 3,607,725 issued Sept. 21, 1971) describes a process for the hydrogenation of non-hydrocarbons in crude or residua feed which comprises passing the crude or residua feed through a metal removal reactor comprising a plurality of catalyst beds through which catalyst falls progressively from the top of the reactor to the bottom while the crude or residua feed is fed upwardly through the catalyst beds in countercurrent to the catalyst flow and passing the residua hydrocarbon from the metal removal reactor to a separator stage.

Subsequent to developing the application of these process principles to crude or residua I have found that a better hydrocracking arrangement is to have a discard zone for pretreating the metal removal reactor effluent at a lower operating temperature and a main hydrocracking zone operated at a temperature corresponding to the desired conversion.

Accordingly, the present invention provides a process for the hydrocracking of crude or residua feed including passing the feed and make-up hydrogen through a metal removal reactor comprising a plurality of catalyst beds through which discrete catalyst particles fall progressively from the top of the reactor to the bottom in countercurrent to the feed and hydrogen, discharging the treated feed from the metal removal reactor and passing it by means of a quench heat exchange to a multi stage, catalyst downflow, hydrocracker zone, wherein the effluent from the metal removal reactor is fed to the hydrocracker zone by way of multi-stage catalyst downflow, discard zone operating at a lower temperature than the hydrocracking zone and using regenerated catalyst from the hydrocracking zone. Thus, hydrocracking catalyst is withdrawn for the first stage of the main hydrocracking zone, regenerated for the removal of carbonaceous deposits on the catalyst, part discarded for eventual addition to the discard zone, and the catalyst, together with fresh hydrocracking catalyst makeup, sulfided for addition to the last stage of the main hydrocracking zone.

The present invention can also be applied to distillate hydrocarbons since distillates contain little vanadium.

The hydrocracking arrangement is schematically illustrated in the accompanying drawing. Effluent from metal removal reactor (not shown) has had most of the heteroatoms removed so that, in general, the vanadium content of the charge corresponds to less than 5 parts per million by weight of the hydrocarbon feed enters the discard zone system 1 by inlet 2. Regenerated catalyst from the hydrocracking zone 3, is fed to the discard zone 1 by line 4 and is transferred down the zone from bed to bed by a series of catalyst transfer stand pipes 5 and valves 6 (one only of each shown). Spent catalyst leaves the discard zone 1 by line 7. Treated residua leaves discard zone 1 by line 8 and passes to the hydrocracking zone 3 passing upwardly through the zone to discharge through line to separation. Catalyst is fed to the top of the hydrocracking zone 3 by lines, the catalyst being fresh make up from line 11 and regenerated catalyst from line 12. Catalyst moved down the beds of the hydrocracking zone by catalyst standpipes 13 and valves 14 (one only of each shown). Catalyst leaves the hydrocracking zone 3 by line for regeneration following which it is partly recycled via line 12 or passed to the discard zone by line 4. Both the discard zone and the hydrocracking zone are provided with liquid recycle as shown by lines 16 and 17 respectively. The discard zone advantageously takes advantage of the catalyst eventually to be discarded by accomplishing most of the hydrocracking at mild temperatures, and utilizing the absorption capacity of the discarded catalyst to achieve further reduction of the vanadium content before it enters the zone wherein catalyst to be periodically regenerated is countercurrently contacting the entering feed.

The periodic regeneration removes the carbonaceous deposits and any vanadium deposited serves as a catalyst during regeneration to convert some of the sulphur being oxidised to induce sulphate formation which results in permanent activity decline. Vanadium is generally used as the active metal in sulphuric acid manufacture because of its efficiency in serving as an oxidising catalyst.

Thus the cleaning of the feed by removal of permanent activity poisons before it enters the regenerative main hydrocracking zone enhances the restoration of activity in removing the non-accumulative carbonaceous deposits which act as a temporary poison.

Because catalyst is regenerated externally under better controlled conditions catalyst usage with catalyst such as tungsten-nickel on silica alumina may be employed with fresh catalyst makeup rates not greater than 36 barrels per pound.

Preferably the ratio of discard stages to hydrocracking stages is 1:3, thus the discard hydrocracking zone typically consists of six stages and the main hydrocracking zone may consist of eighteen stages. The discard zone liquid recycle used to remove the heat of reaction in excess of the chemical hydrogen consumed supplied to each stage typically uses a cold residua product recycle boiling above the diesel fraction. The main hydrocracking zone liquid recycle typically was a cold, heavy vacuum distillate recycle. Liquid recycles other than product may be employed such as Libyan or Nigerian residua for the discard zone recycle as it is relatively low in herteroatoms and has a vanadium content below 5 parts per million.

What I claim is:

1. A process for the hydrocracking of crude or residua feed including passing the feed and make-up hydrogen through a metal removal reactor comprising a plurality of catalyst beds through which discrete catalyst particles fall progressively from the top of the reactor to the bottom in countercurrent to the feed and hydrogen, discharging the treated feed from the metal removal reactor and passing it by means of a quench heat exchange to a multi-stage, catalyst downflow, main hydrocracker zone, wherein the effluent from the metal removal reactor is fed to the main hydrocracker zone by passing it through a multi-stage catalyst downflow, discard zone operating at a lower temperature than the main hydrocracking zone and using regenerated catalyst from the hydrocracking zone.

2. A process as claimed in claim 1 wherein regenerated catalyst from the main zone is passed to the discard zone on a predetermined basis in accordance with the metal content of the feed to the discard zone.

3. A process as claimed in claim 1 wherein the ratio of stages of the discard zone to main hydrocracking zone is 1:3.

4. A process as claimed in claim 1 wherein the discard zone is provided with liquid recycle using cold product or residua low in heteroatoms.

References Cited
UNITED STATES PATENTS

| | | | |
|---|---|---|---|
| 2,987,470 | 6/1961 | Turken | 208—253 |
| 3,496,099 | 2/1970 | Bridge | 208—251 H |
| 3,553,106 | 1/1971 | Hamilton et al. | 208—251 H |
| 3,576,737 | 4/1971 | Hitchell | 208—251 H |
| 3,607,725 | 9/1971 | Irvine | 208—89 |

DELBERT E. GANTZ, Primary Examiner

G. E. SCHMITKONS, Assistant Examiner

U.S. Cl. X.R.

208—89, 251 H